US012681790B2

(12) United States Patent
Balla

(10) Patent No.: US 12,681,790 B2
(45) Date of Patent: Jul. 14, 2026

(54) METHOD AND SYSTEM FOR TRIGGERING ALERTS ON IDENTIFICATION OF AN ANOMALY IN DATA LOGS

(71) Applicant: JPMorgan Chase Bank, N.A., New York, NY (US)

(72) Inventor: Durga Shanker Balla, Rangareddy (IN)

(73) Assignee: JPMORGAN CHASE BANK, N.A., New York, NY (US)

( * ) Notice: Subject to any disclaimer, the term of this patent is extended or adjusted under 35 U.S.C. 154(b) by 68 days.

(21) Appl. No.: 18/212,447

(22) Filed: Jun. 21, 2023

(65) Prior Publication Data

US 2024/0370328 A1 Nov. 7, 2024

(30) Foreign Application Priority Data

May 5, 2023 (IN) .............................. 202311032030

(51) Int. Cl.
*G06F 11/00* (2006.01)
*G06F 11/07* (2006.01)

(52) U.S. Cl.
CPC ...... *G06F 11/0769* (2013.01); *G06F 11/0721* (2013.01); *G06F 11/079* (2013.01)

(58) Field of Classification Search
CPC . G06F 11/0769; G06F 11/0721; G06F 11/079
See application file for complete search history.

(56) References Cited

U.S. PATENT DOCUMENTS

| | | | | |
|---|---|---|---|---|
| 2018/0165171 A1* | 6/2018 | VanBuskirk | ........ | G06F 11/2257 |
| 2018/0173584 A1* | 6/2018 | Eckstein | ............. | G06F 11/0775 |
| 2019/0065297 A1* | 2/2019 | Eichelberger | ....... | G06F 11/3476 |
| 2020/0174870 A1* | 6/2020 | Xu | ........................ | G06F 11/0769 |
| 2020/0183805 A1* | 6/2020 | Togawa | .............. | G06F 11/3476 |
| 2020/0250477 A1* | 8/2020 | Barthur | .............. | G06F 11/0751 |
| 2020/0334092 A1* | 10/2020 | Ravitzki | ............... | G06F 11/079 |
| 2021/0064500 A1* | 3/2021 | Przestrzelski | ......... | G06F 11/079 |
| 2023/0153223 A1* | 5/2023 | Sankaranarayanan | ...................... | G06F 11/3006 714/48 |
| 2023/0229540 A1* | 7/2023 | King | ........................ | G06F 16/35 714/57 |
| 2023/0236923 A1* | 7/2023 | Gowri | ................. | G06F 11/0709 714/4.1 |

* cited by examiner

*Primary Examiner* — Philip Guyton
(74) *Attorney, Agent, or Firm* — GREENBLUM & BERNSTEIN, P.L.C.

(57) ABSTRACT

A method and system for automatically triggering alerts for at least one anomaly are disclosed. The method includes receiving a plurality of data logs associated with a plurality of applications. Next, the method includes trimming the plurality of data logs into a set of data logs and comparing the set of data logs with each of a plurality of previously stored set of data logs. Next, the method includes identifying a set of new events associated with the at least one anomaly. Next, the method includes analyzing the set of new events to identify a pattern associated with the at least one anomaly and displaying, via a display, the pattern associated with the at least one anomaly to at least one entity. Thereafter, the method includes automatically triggering the alerts for the at least one anomaly based on the identification of the pattern associated with the at least one anomaly.

12 Claims, 6 Drawing Sheets

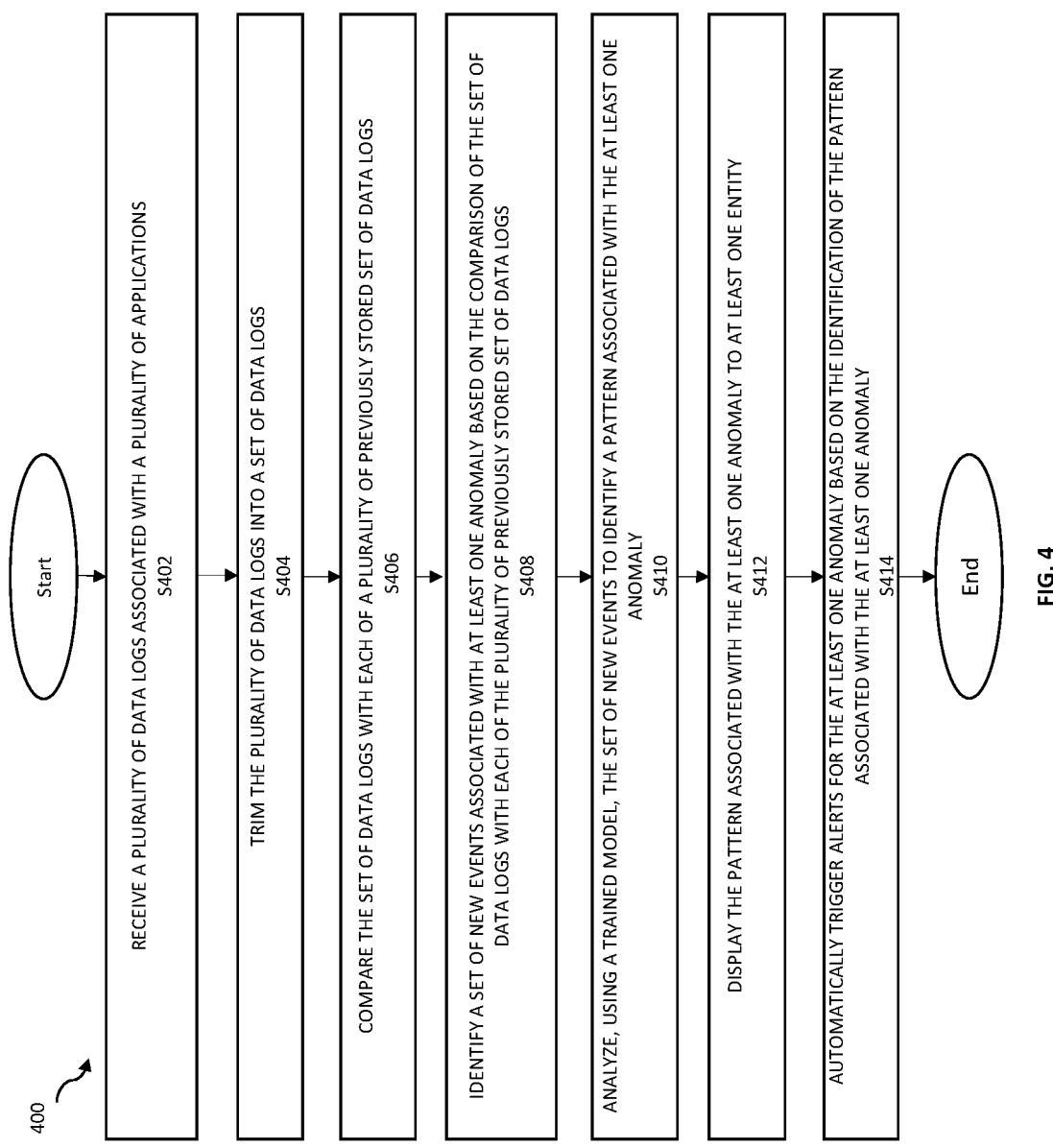

400

Start

RECEIVE A PLURALITY OF DATA LOGS ASSOCIATED WITH A PLURALITY OF APPLICATIONS
S402

TRIM THE PLURALITY OF DATA LOGS INTO A SET OF DATA LOGS
S404

COMPARE THE SET OF DATA LOGS WITH EACH OF A PLURALITY OF PREVIOUSLY STORED SET OF DATA LOGS
S406

IDENTIFY A SET OF NEW EVENTS ASSOCIATED WITH AT LEAST ONE ANOMALY BASED ON THE COMPARISON OF THE SET OF DATA LOGS WITH EACH OF THE PLURALITY OF PREVIOUSLY STORED SET OF DATA LOGS
S408

ANALYZE, USING A TRAINED MODEL, THE SET OF NEW EVENTS TO IDENTIFY A PATTERN ASSOCIATED WITH THE AT LEAST ONE ANOMALY
S410

DISPLAY THE PATTERN ASSOCIATED WITH THE AT LEAST ONE ANOMALY TO AT LEAST ONE ENTITY
S412

AUTOMATICALLY TRIGGER ALERTS FOR THE AT LEAST ONE ANOMALY BASED ON THE IDENTIFICATION OF THE PATTERN ASSOCIATED WITH THE AT LEAST ONE ANOMALY
S414

End

FIG. 4

METHOD AND SYSTEM FOR TRIGGERING ALERTS ON IDENTIFICATION OF AN ANOMALY IN DATA LOGS

CROSS-REFERENCE TO RELATED APPLICATIONS

This application claims the benefit of priority from Indian patent application No. 202311032030, filed May 5, 2023, which is herein incorporated by reference in its entirety.

FIELD OF THE DISCLOSURE

This technology generally relates to methods and systems for triggering alerts on identification of at least one anomaly in data logs, and more particularly to a method and system for identifying a pattern of occurrence of the at least one anomaly in the data logs using trained models and automatically triggering the alerts to support team based on the pattern of the occurrence of the at least one anomaly in the data logs.

BACKGROUND INFORMATION

The following description of the related art is intended to provide background information pertaining to the field of the disclosure. This section may include certain aspects of the art that may be related to various features of the present disclosure. However, it should be appreciated that this section is used only to enhance the understanding of the reader with respect to the present disclosure, and not as admission of the prior art.

As is generally known, organizations are expected to ensure the availability of applications for the smooth functioning of the organization and satisfactory end-user experience. The occurrence of errors and anomalies in data is considered a prime reason for affecting the performance and availability of applications. The production support team in the organization is usually entrusted with the responsibility of ensuring the availability of applications. Conventionally, the developer of the applications decides and sets a threshold of errors or data anomalies after which the intervention and handling of anomalies by the production support team are required.

The major problem is associated with the continuous occurrence of anomalies over an extended period even after defining a threshold of errors or anomalies by the developer. In such a scenario, the threshold set for triggering an alert to the production support team is not breached but still, the overall availability of applications is observed to be lower than the set standard of criticality. The inability to detect and trigger alerts to the production support team for the unresolved data anomaly adversely affects the performance of the applications framework of the organization. The unresolved data anomaly and errors additionally become the reason for end-user dissatisfaction and unavailability of critical services to the end-users.

Hence, in view of these and other existing limitations, there arises an imperative need to provide an efficient solution to overcome the above-mentioned limitations and to provide a method and system for identifying at least one anomaly in data logs and automatically triggering alerts to at least one entity such as user.

SUMMARY

The present disclosure, through at least one from among its various aspects, embodiments, and/or specific features or sub-components, provides, inter alia, various systems, servers, devices, methods, media, programs, and platforms for automatically triggering alerts to at least one entity for at least one anomaly.

According to an aspect of the present disclosure, a method for automatically triggering alerts for at least one anomaly is disclosed. The method is implemented by at least one processor. The method includes receiving, by the at least one processor, a plurality of data logs associated with a plurality of applications. Next, the method includes trimming, by the at least one processor, the plurality of data logs into a set of data logs. Next, the method includes comparing, by the at least one processor, the set of data logs with each of a plurality of previously stored set of data logs. Next, the method includes identifying, by the at least one processor, a set of new events associated with the at least one anomaly based on the comparison of the set of data logs with each of the plurality of previously stored set of data logs. Next, the method includes analyzing, by the at least one processor using a trained model, the set of new events to identify a pattern associated with the at least one anomaly. Next, the method includes displaying, by the at least one processor via a display, the pattern associated with the at least one anomaly to at least one entity. Thereafter, the method includes automatically triggering, by the at least one processor, the alerts for the at least one anomaly based on the identification of the pattern associated with the at least one anomaly.

In accordance with an exemplary embodiment, the pattern associated with the at least one anomaly is displayed to the at least one entity in a form of a visual representation.

In accordance with an exemplary embodiment, the plurality of previously stored set of data logs corresponds to at least one from among previous day stored logs, previous week stored logs, two weeks prior stored logs.

In accordance with an exemplary embodiment, the at least one anomaly is identified based on a deviation in the set of data logs with each of the plurality of previously stored set of data logs.

In accordance with an exemplary embodiment, the plurality of the data logs is trimmed into the set of data logs using a data modeling technique.

According to another aspect of the present disclosure, a computing device configured to implement the execution of a method for automatically triggering alerts for at least one anomaly is disclosed. The computing device includes a processor, a memory, and a communication interface coupled to each of the processor and the memory. The processor may be configured to receive, via the communication interface, a plurality of data logs associated with a plurality of applications. Next, the processor may be configured to trim the plurality of data logs into a set of data logs. Next, the processor may be configured to compare the set of data logs with each of a plurality of previously stored set of data logs. Next, the processor may be configured to identify a set of new events associated with the at least one anomaly based on the comparison of the set of data logs with each of the plurality of previously stored set of data logs. Next, the processor may be configured to analyze the set of new events to identify a pattern associated with the at least one anomaly. Next, the processor may be configured to display the pattern associated with the at least one anomaly to at least one entity. Thereafter, the processor may be configured to automatically trigger the alerts for the at least one anomaly based on the identification of the pattern associated with the at least one anomaly.

In accordance with an exemplary embodiment, the pattern associated with the at least one anomaly is displayed to the at least one entity in a form of a visual representation.

In accordance with an exemplary embodiment, the plurality of previously stored set of data logs corresponds to at least one from among previous day stored logs, previous week stored logs, two weeks prior stored logs.

In accordance with an exemplary embodiment, the at least one anomaly is identified based on a deviation in the set of data logs with each of the plurality of previously stored set of data logs.

In accordance with an exemplary embodiment, the plurality of the data logs is trimmed into the set of data logs using a data modeling technique.

According to yet another aspect of the present disclosure, a non-transitory computer-readable storage medium storing instructions for automatically triggering alerts for at least one anomaly is disclosed. The instructions include executable code which, when executed by a processor, may cause the processor to receive, via a communication interface, a plurality of data logs associated with a plurality of applications; trim the plurality of data logs into a set of data logs; compare the set of data logs with each of a plurality of previously stored set of data logs; identify a set of new events associated with the at least one anomaly based on the comparison of the set of data logs with each of the plurality of previously stored set of data logs; analyze the set of new events to identify a pattern associated with the at least one anomaly; display, via a display, the pattern associated with the at least one anomaly to at least one entity; and automatically trigger the alerts for the at least one anomaly based on the identification of the pattern associated with the at least one anomaly.

In accordance with an exemplary embodiment, the pattern associated with the at least one anomaly is displayed to the at least one entity in a form of a visual representation.

In accordance with an exemplary embodiment, the plurality of previously stored set of data logs corresponds to at least one from among previous day stored logs, previous week stored logs, two weeks prior stored logs.

In accordance with an exemplary embodiment, the at least one anomaly is identified based on a deviation in the set of data logs with each of the plurality of previously stored set of data logs.

In accordance with an exemplary embodiment, the plurality of the data logs is trimmed into the set of data logs using a data modeling technique.

BRIEF DESCRIPTION OF THE DRAWINGS

The present disclosure is further described in the detailed description which follows, in reference to the noted plurality of drawings, by way of non-limiting examples of exemplary embodiments of the present disclosure, in which like characters represent like elements throughout the several views of the drawings.

FIG. 4 illustrates an exemplary method flow diagram for automatically triggering alerts for at least one anomaly in accordance with an exemplary embodiment.

DETAILED DESCRIPTION

Figure 1:
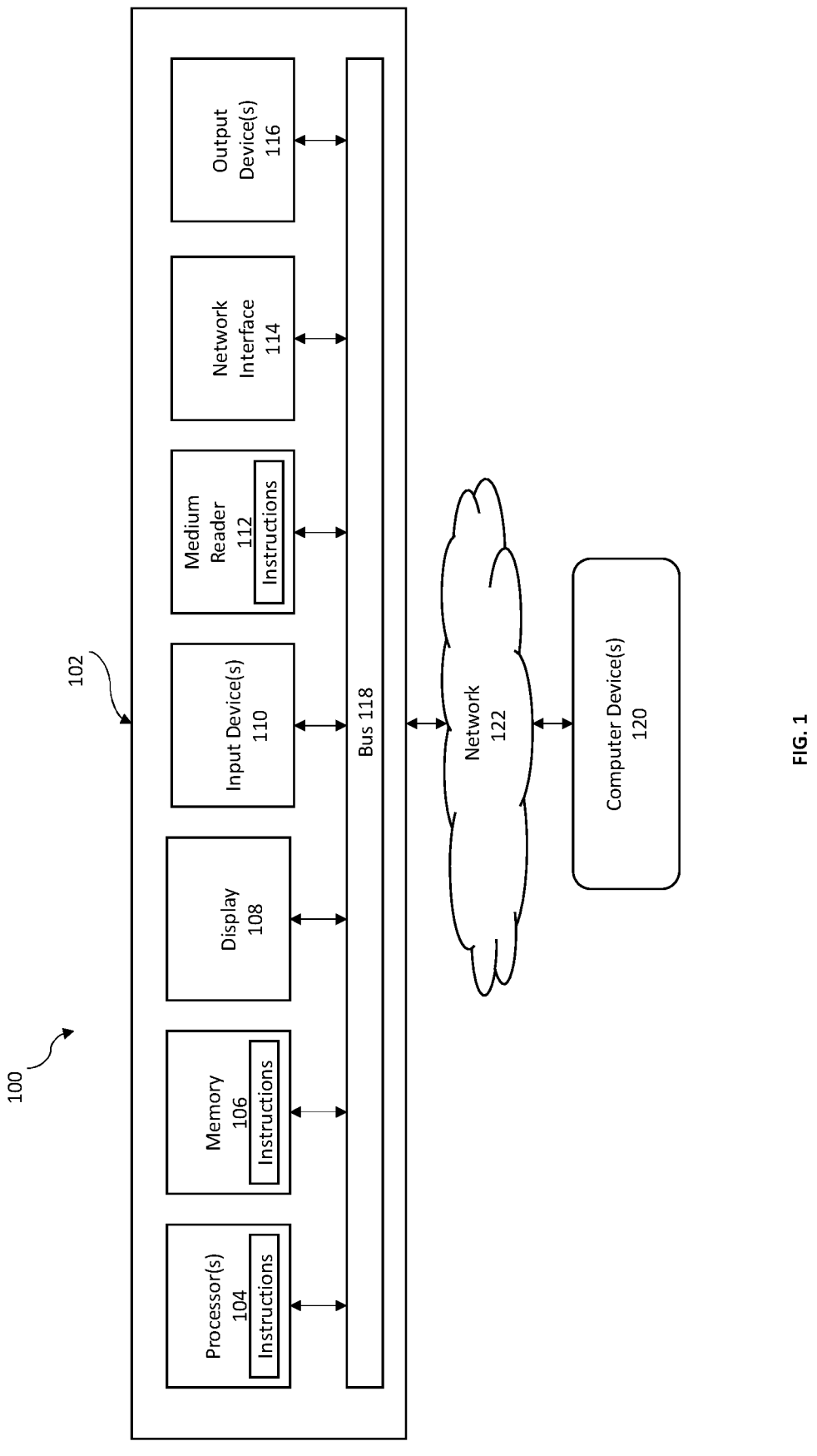
FIG. 1 illustrates an exemplary computer system for automatically triggering alerts for at least one anomaly in accordance with an exemplary embodiment.

Exemplary embodiments now will be described with reference to the accompanying drawings. The invention may, however, be embodied in many different forms and should not be construed as limited to the embodiments set forth herein; rather, these embodiments are provided so that this invention will be thorough and complete, and will fully convey its scope to those skilled in the art. The terminology used in the detailed description of the particular exemplary embodiments illustrated in the accompanying drawings is not intended to be limiting. In the drawings, like numbers refer to like elements.

The specification may refer to "an," "one" or "some" embodiment(s) in several locations. This does not necessarily imply that each such reference is to the same embodiment(s), or that the feature only applies to a single embodiment. Single features of different embodiments may also be combined to provide other embodiments.

As used herein, the singular forms "a," "an" and "the" are intended to include the plural forms as well, unless expressly stated otherwise. It will be further understood that the terms "include", "comprises", "including" and/or "comprising" when used in this specification, specify the presence of stated features, integers, steps, operations, elements, and/or components, but do not preclude the presence or addition of at least from among other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations and arrangements of one or more of the associated listed items. Also, as used herein, the phrase "at least one" means and includes "one or more" and such phrases or terms can be used interchangeably.

Unless otherwise defined, all terms (including technical and scientific terms) used herein have the same meaning as commonly understood by one of ordinary skill in the art to which this invention pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The figures depict a simplified structure only showing some elements and functional entities, all being logical units whose implementation may differ from what is shown. The connections shown are logical connections; the actual physical connections may be different.

In addition, all logical units and/or controllers described and depicted in the figures include the software and/or hardware components required for the unit to function.

Further, each unit may include within itself one or more components, which are implicitly understood. These components may be operatively coupled to each other and be configured to communicate with each other to perform the function of the said unit.

In the following description, for the purposes of explanation, numerous specific details have been set forth in order to provide a description of the invention. It will be apparent, however, that the invention may be practiced without these specific details and features.

Through one or more of its various aspects, embodiments and/or specific features or sub-components of the present disclosure, are intended to bring out one or more of the advantages as specifically described above and noted below.

The examples may also be embodied as one or more non-transitory computer-readable storage media having instructions stored thereon for one or more aspects of the present technology as described and illustrated by way of the examples herein. The instructions in some examples include executable code that, when executed by one or more processors, causes the processors to carry out steps necessary to implement the methods of the examples of this technology that are described and illustrated herein.

To overcome the problems associated with ensuring availability and proper functioning of applications to the users, the present disclosure provides a method and system for identification of at least one anomaly in data logs and automatically triggering alerts to at least one entity for the at least one anomaly. The system first receives a plurality of data logs associated with a plurality of applications. In an example, the plurality of data logs received by the system are associated with Applications A, B, and C. Next, the system trims the plurality of data logs into a set of data logs with required fields. In an example, data modeling techniques are used to trim the plurality of data logs into the set of data logs. Next, the system compares the set of data logs with each of a plurality of previously stored set of data logs. In an example, the set of data logs of present day or current data logs is compared to at least one from among a set of stored data logs of yesterday, a set of stored data logs of corresponding working day of previous week, and a set of stored data logs of corresponding working day of a week prior to the previous week. Next, the system identifies a set of new events associated with the at least one anomaly based on the comparison of the set of data logs with each of the plurality of previously stored set of data logs. In an example, the at least one anomaly may be associated with an error in reading a tax related document on an application of a banking services provider entity. Next, the system analyzes the set of new events to identify a pattern associated with the at least one anomaly. In an example, the analysis of the set of new events to identify the pattern associated with the at least one anomaly is performed using a trained model. In another example, pattern identification is done by using data mining techniques. The pattern identification is used to identify trend of occurrence of the at least one anomaly in the data that may be associated with known set of errors provided by application developers, sudden change in a data traffic on cloud-based servers, sudden increase in error messages received from the end-users, and the like. Next, the system displays the identified pattern associated with the at least one anomaly to at least one entity. In an example, the pattern is displayed to a user in the form of tabular or graphical representation depicting the frequency of occurrence of an error or an anomaly over a period of time, for instance over a week. In an example, the at least one entity may correspond to a user, production team, support team, developer, error resolution platform and the like. Thereafter, the system automatically triggers the alerts for the at least one anomaly based on the identification of the pattern associated with the at least one anomaly. In an example, at least one alert is triggered to the production support team on detection of the occurrence of the at least one anomaly and to suggest the need for resolution and handling of the at least one identified data anomaly.

In a non-limiting example, Application A is developed for providing banking related services to end-users under the banking services, for instance, the retail customers. In the present example, a possible set of errors provided by the application developers for Application A may include errors experienced by the end-users of the application A in viewing the bills, viewing tax related documents, viewing the spending related activities, downloading the account statements, and the like.

In an example, the production support team is responsible for maintenance of the applications used by an organization. In general, the application developer of an application provides the possible errors and the corresponding resolution to the errors. Additionally, a threshold of error identified per minute for the developed application is provided by the developer. In an event the identified errors per minute exceed the threshold, an alert is triggered to the production support team. However, this process is faulty and unreliable in situations where the errors persist for long durations without breaching the set threshold of error per minute. Thus, the conventionally available solutions are unreliable and not recommended. Therefore, as per the solution of the present disclosure, the system is configured to identify events associated with data anomaly and automatically trigger the alerts to the production support team. The present disclosure uses a trained model to automatically adjust alerting thresholds based on various parameters such as traffic patterns at the cloud-based servers associated with the organization. The identified occurrence of the at least one anomaly is associated with the identified set of errors provided by the application developer, an unusual change in data traffic at the cloud-based servers, an unusual increase in errors reported by end users, and the like.

Therefore, the present disclosure aids in the prompt identification of data anomalies and triggering the alerts to the production support team. The complexity of the process of setting a threshold of errors per minute by the developer is avoided by the implementation of the present disclosure. The implementation of features of the present disclosure results in achieving better efficiency and performance owing to the factors explained above. In an example, the factors include but are not limited to avoiding the requirement of setting a threshold of errors in advance, better handling of Business as Usual (BAU) errors, automatic triggering alert to the production support team, detecting errors persisting over a long duration of time efficiently, displaying the trend and pattern associated with the occurrence of anomalies in past.

FIG. 1 is an exemplary system for use in accordance with the embodiments described herein. The system 100 is generally shown and may include a computer system 102, which is generally indicated. The term "computer system" may also be referred to as "computing device" and such phrases/terms can be used interchangeably in the specifications.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud-based environment. Even further, the instructions may be operative in such cloud-based computing environment.

In a networked deployment, the computer system 102 may operate in the capacity of a server or as a client-user computer in a server-client user network environment, a client-user computer in a cloud-based computing environment, or as a peer computer system in a peer-to-peer (or distributed) network environment. The computer system 102, or portions thereof, may be implemented as, or incorporated into, various devices, such as a personal computer, a virtual desktop computer, a tablet computer, a set-top box, a personal digital assistant, a mobile device, a palmtop computer, a laptop computer, a desktop computer, a communications device, a wireless smartphone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As used herein, the at least one anomaly may correspond to occurrence of at least one error in an application developed by a developer, a sudden change in the data traffic, a sudden increase in error messages from end-users, and the like.

As used herein, a plurality of previously stored sets of data logs corresponds to at least one from among previous day stored logs, previous week stored logs, two weeks prior stored logs.

As used herein, at least one entity corresponds to at least one user associated with anomaly resolution team, anomaly resolution platform. In a non-limiting example, the at least one entity may correspond to the production support team responsible for fixing the anomalies identified in the data logs.

As illustrated in FIG. 1, the computer system 102 may include at least one processor 104. Processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. Processor 104 is an article of manufacture and/or a machine component. The processor 104 is configured to execute software instructions in order to perform functions as described in the various embodiments herein. The processor 104 may be a general-purpose processor or may be part of an application-specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable storage mediums from which data and executable instructions can be read by a computer. Memories, as described herein, may be random access memory (RAM), read-only memory (ROM), flash memory, electrically programmable read-only memory (EPROM), electrically erasable programmable read-only memory (EEPROM), registers, a hard disk, a cache, a removable disk, tape, compact disk read-only memory (CD-ROM), digital versatile disk (DVD), floppy disk, Blu-ray disk, or any other form of storage medium known in the art. Memories may be volatile or non-volatile, secure and/or encrypted, unsecured and/or unencrypted. As regards the present disclosure, the computer memory 106 may include any combination of memories or a single storage.

The computer system 102 may further include a Display Unit 108, such as a liquid crystal display (LCD), an organic light emitting diode (OLED), a flat panel display, a solid-state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote-control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software, or any combination thereof which are commonly known and understood as being included with or within a computer system, such as but is not limited to, a network interface 114 and an output device 116. The output device 116 may be, but is not limited to, a speaker, an audio out, a video out, a remote-control output, a printer, or any combination thereof. Additionally, the term "Network interface" may also be referred to as "Communication interface" and such phrases/terms can be used interchangeably in the specifications.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect expresses, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near-field communication, ultra-band, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer (PC). However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments enable optimized methods and systems for identification of at least one anomaly in data logs and automatically triggering the alerts for the at least one anomaly to at least one entity.

Figure 2:
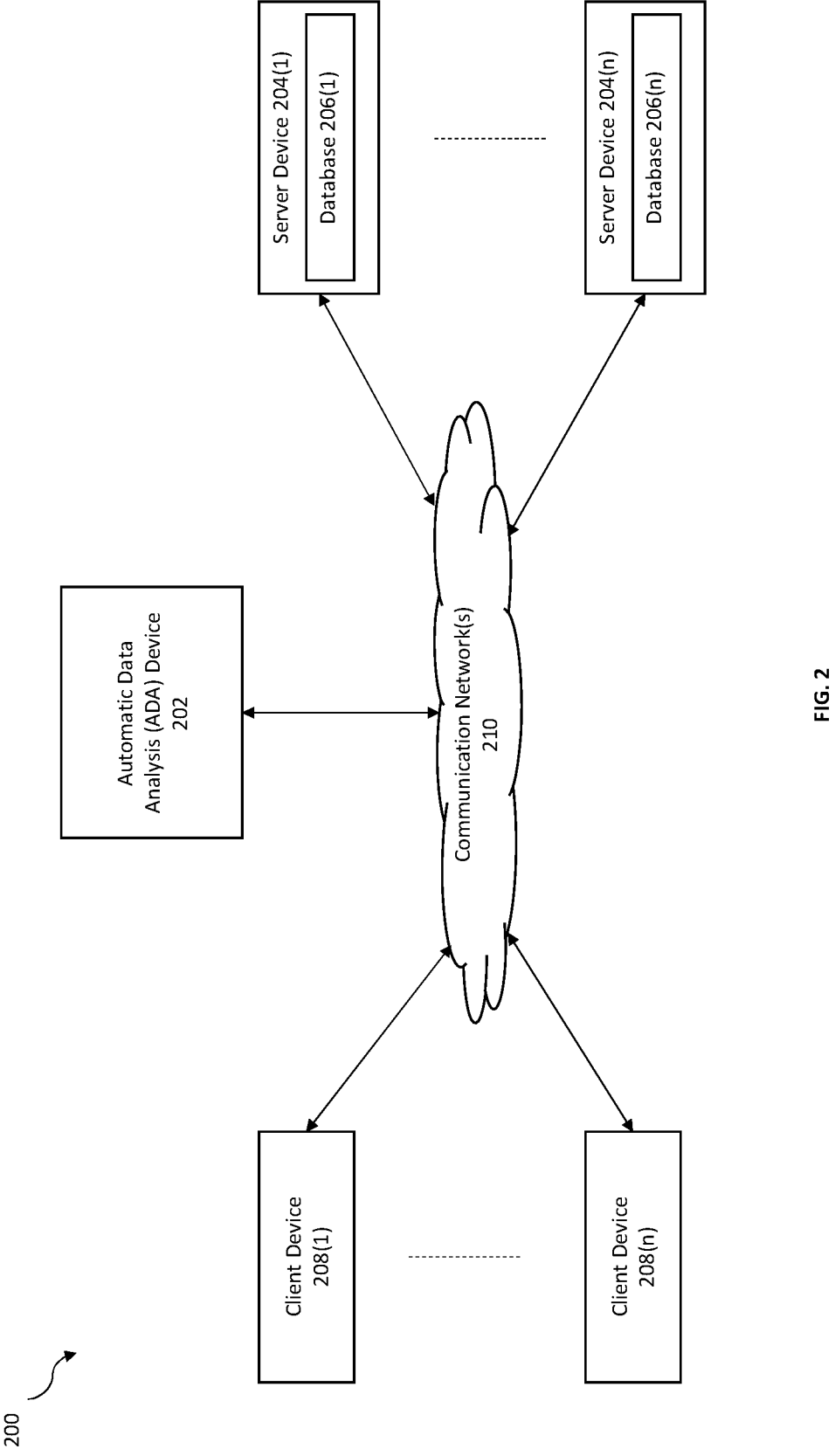
FIG. 2 illustrates an exemplary diagram of a network environment for automatically triggering alerts for at least one anomaly in accordance with an exemplary embodiment.

Referring to FIG. 2, a schematic of an exemplary network environment 200 for implementing a method for automatically triggering alerts for at least one anomaly is illustrated. In an exemplary embodiment, the method is executable on any networked computer platform, such as, for example, a personal computer (PC).

The method for automatically triggering the alerts for the at least one anomaly may be implemented by an Automatic Data Analysis (ADA) device 202. The ADA device 202 may be the same or similar to the computer system 102 as described with respect to FIG. 1. The ADA device 202 may store at least one application that can include executable instructions that, when executed by the ADA device 202, cause the ADA device 202 to perform desired actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

In a non-limiting example, the application(s) may be operative in a cloud-based computing environment. The application(s) may be executed within or as a virtual machine(s) or virtual server(s) that may be managed in a cloud-based computing environment. Also, the application (s), and even the ADA device 202 itself, may be located in the virtual server(s) running in a cloud-based computing environment rather than being tied to one or more specific physical network computing devices. Also, the application (s) may be running in one or more virtual machines (VMs) executing on the ADA device 202. Additionally, in one or more embodiments of this technology, virtual machine(s) running on the ADA device 202 may be managed or supervised by a hypervisor.

In the network environment 200 of FIG. 2, the ADA device 202 is coupled to a plurality of server devices 204(1)-204(n) that hosts a plurality of databases 206(1)-206 (n), and also to a plurality of client devices 208(1)-208(n) via communication network(s) 210. A communication interface of the ADA device 202, such as the network interface 114 of the computer system 102 of FIG. 1, operatively couples and communicates between the ADA device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the ADA device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer-readable storage media, and ADA devices that efficiently implement a method for the identification of the at least one anomaly in data logs and automatically triggering the alerts for the at least one anomaly to at least one entity for resolution of the identified at least one anomaly in the data logs.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, tele traffic in any suitable form (e.g., voice, modem, and the like), Public Switched Telephone Networks (PSTNs), Ethernet-based Packet Data Networks (PDNs), combinations thereof, and the like.

The ADA device 202 may be a standalone device or integrated with one or more other devices or apparatuses, such as one or more of the server devices 204(1)-204(n), for example. In one particular example, the ADA device 202 may include or be hosted by one of the server devices 204(1)-204(n), and other arrangements are also possible. Moreover, one or more of the devices of the ADA device 202 may be in a same or a different communication network including one or more public, private, or cloud-based networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. In an example, the server devices 204(1)-204(n) may process requests received from the ADA device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store data that relates resolution of production problems, storage planning, schedule planning, datasets that relates to the prediction of resolution to production problems, and machine learning models.

Although the server devices 204(1)-204(n) are illustrated as single devices, one or more actions of each of the server devices 204(1)-204(n) may be distributed across one or more distinct network computing devices that together include one or more of the server devices 204(1)-204(n). Moreover, the server devices 204(1)-204(n) are not limited to a particular configuration. Thus, the server devices 204(1)-204(n) may contain a plurality of network computing devices that operate using a controller/agent approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to-peer architecture, virtual machines, or within a cloud-based architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the ADA device 202 via communication network(s) 210. Accordingly, the client devices 208(1)-208(n) may be mobile computing devices, desktop computing devices, laptop computing devices, tablet computing devices, or the like, that host chat, e-mail, or voice-to-text applications, for example. In an exemplary embodiment, at least one client device 208 is a wireless mobile communication device, e.g., a smartphone.

The client devices 208(1)-208(n) may run interface applications, such as standard web browsers or standalone client applications, which may enable an interface to communicate with the ADA device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the ADA device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the ADA device 202, the server devices 204(1)-204(n), or the client devices 208(1)-208(n), for example, may be configured to operate as virtual instances on the same physical machine. In other words, one or more of the ADA devices 202, the server devices 204(1)-204(n), or the client devices 208(1)-208(n) may operate on the same physical device rather than as separate devices communicating through communication network(s) 210. Additionally, there may be more or fewer ADA devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication, also may be implemented, as desired, to increase the robustness and performance of the devices and systems of the examples. The examples may also be implemented on computer system(s) that extend across any suitable network using any suitable interface mechanisms and traffic technologies, including by way of example only tele traffic in any suitable form (e.g., voice and modem), wireless traffic networks, cellular traffic networks, Packet Data Networks (PDNs), the Internet, intranets, and combinations thereof.

Figure 3:
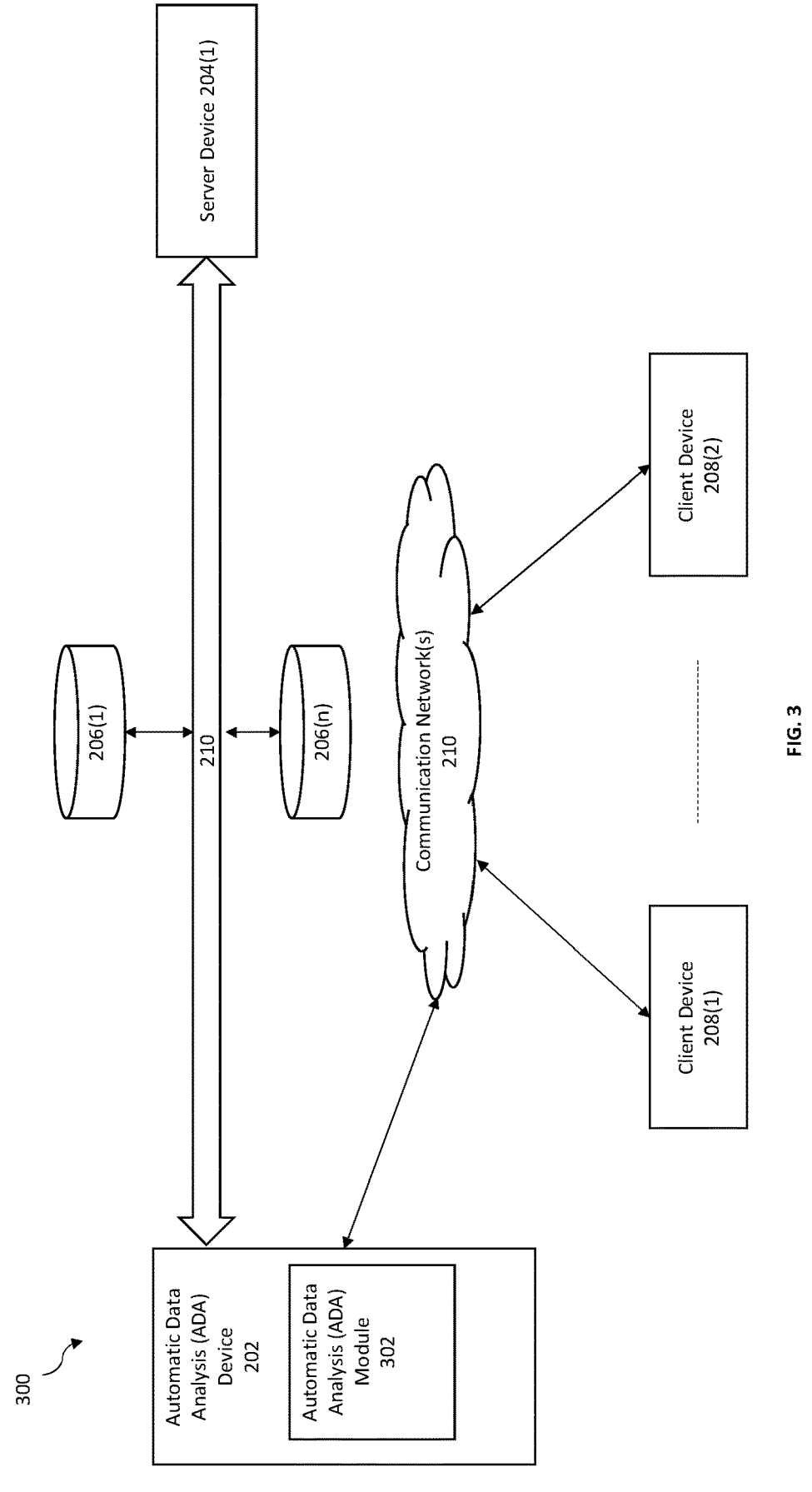
FIG. 3 illustrates an exemplary system for automatically triggering alerts for at least one anomaly in accordance with an exemplary embodiment.

FIG. 3 illustrates an exemplary system for implementing a method for automatically triggering alerts for at least one anomaly in accordance with an exemplary embodiment. As illustrated in FIG. 3, according to exemplary embodiments, the system 300 may include an ADA device 202 including an Automatic Data Analysis (ADA) module 302 that may be connected to a server device 204(1) and one or more repositories 206(1) 206(n) via a communication network 210, but the disclosure is not limited thereto.

The ADA device 202 is described and shown in FIG. 3 as including an ADA module 302, although it may include other rules, policies, modules, databases, or applications, for example. As will be described below, the ADA module 302 is configured to implement a method for identification of the at least one anomaly in data logs and automatically triggering the alerts to at least one entity for the at least one identified anomaly.

An exemplary process 300 for implementing a mechanism for automatically triggering the alerts for the at least one anomaly to the at least one entity by utilizing the network environment of FIG. 2 is shown as being executed in FIG. 3. Specifically, a first client device 208(1) and a second client device 208(2) are illustrated as being in communication with ADA device 202. In this regard, the first client device 208(1) and the second client device 208(2) may be "clients" of the ADA device 202 and are described herein as such. Nevertheless, it is to be known and understood that the first client device 208(1) and/or the second client device 208(2) need not necessarily be "clients" of the ADA device 202, or any entity described in association therewith herein. Any additional or alternative relationship may exist between either or both of the first client device 208(1) and the second client device 208(2) and the ADA device 202, or no relationship may exist.

Further, ADA device 202 is illustrated as being able to access one or more repositories 206(1) . . . 206(n). The ADA module 302 may be configured to access these repositories/databases for implementing a method for automatically triggering the alerts for the at least one anomaly to the at least one entity.

The first client device 208(1) may be, for example, a smartphone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may include plural networks as described above. For example, in an exemplary embodiment, either or both of the first client device 208(1) and the second client device 208(2) may communicate with the ADA device 202 via broadband or cellular communication. Of course, these embodiments are merely exemplary and are not limiting or exhaustive.

Referring to FIG. 4, an exemplary method 400 is shown for automatically triggering alerts for at least one anomaly in accordance with an exemplary embodiment. As shown in FIG. 4, the method begins following a need for identification of occurrence of the at least one anomaly in a plurality of data logs associated with a plurality of applications and thereafter for getting an alert for the at least one identified anomaly.

At step S402, the method includes receiving, by the at least one processor 104 via a communication interface, a plurality of data logs associated with a plurality of applications. In a non-limiting exemplary embodiment, the plurality of data logs is associated with five applications A, B, C, D, and E.

At step S404, the method includes trimming, by the at least one processor 104, the plurality of data logs into a set of data logs. In an example, the plurality of data logs associated with the five applications is subjected to data modeling. The trimming of the plurality of data logs into the set of data logs is performed to identify required and relevant data logs that may be associated with the data anomaly. The identified data logs are trimmed versions of the received plurality of data logs and are stored as the set of data logs. The trimming of the plurality of data logs is done to quickly analyze bulk data and to save time in anomaly detection.

At step S406, the method includes comparing, by the at least one processor, the set of data logs with each of a plurality of previously stored set of data logs. In an example, the set of data logs is compared with stored set of data logs of previous days and previous weeks. The set of data logs of Tuesday (e.g., current working day) is compared with the set of data logs of Monday (e.g., one day before). Also, the set of data logs of Tuesday is compared with the set of data logs of last Tuesday that fall in previous week. Additionally, the set of data logs of Tuesday is compared with the set of data logs of Tuesday that fall in a week prior to the previous week. In a non-limiting exemplary embodiment, the set of data logs are stored in a form of images for faster comparison of the current set of data logs with the previously stored set of data logs.

At step S408, the method includes identifying, by the at least one processor 104, a set of new events associated with the at least one anomaly based on the comparison of the set of data logs with each of the plurality of previously stored set of data logs. In a non-limiting exemplary embodiment, the at least one anomaly is identified based on a deviation in the set of data logs with each of the plurality of previously stored set of data logs. The plurality of previously stored set of data logs corresponds to at least one from among previous day stored logs, previous week stored logs, two weeks prior stored logs. In an example, the comparison is performed on set of data logs of present day, for instance, Tuesday with the set of data logs of Monday, also set of data logs of Tuesday is compared with the set of data logs of Tuesday of the previous week, and additionally set of data logs of Tuesday is compared with the set of data logs of Tuesday of the week just prior to the previous week. The comparison aids in identification of new events associated with the at least one anomaly in the set of data logs of Tuesday. The purpose of performing three comparisons is to ensure greater accuracy in the detection of set of events associated with the at least one data anomaly. In an example, if Tuesday of the previous week is a non-working day, and the present Tuesday is a working day. The comparison of the set of data logs for the present Tuesday with that of the Tuesday of the previous week may lead to unreliable and erroneous results. In such a situation, the comparison of the set of data logs of the present Tuesday with a Tuesday of the week just prior to the previous week (e.g., two weeks) ensures accuracy in the process of anomaly detection in the set of data logs for the present Tuesday. In an exemplary embodiment, the result of the three comparisons may be stored in the form of a Cache Server Page (CSP) file. In a non-limiting embodiment, the set of data logs may also be compared with any suitable number of previous days, weeks, months, years to enhance the accuracy and outcome of the present disclosure.

At step S410, the method includes analyzing, by the at least one processor 104 using a trained model, the set of new events to identify a pattern associated with the at least one anomaly. In an example, the identified pattern is associated with the occurrence of new events associated with the at least one anomaly. The pattern identification is done using the trained model that may additionally rely upon data mining techniques. In a non-limiting embodiment, the trained model is a data-driven model. The data mining techniques are useful in improving accuracy of the trained model in identifying the set of events associated with the at least one anomaly. In a non-limiting embodiment, the trained model corresponds to either a supervised or an unsupervised machine learning model. In an exemplary embodiment, machine learning may include supervised learning algorithms such as, for example, k-medoids analysis, regression analysis, decision tree analysis, random forest analysis, k-nearest neighbors' analysis, logistic regression analysis, K-fold cross-validation analysis, balanced class weight analysis, and the like.

At step S412, the method includes displaying, by the at least one processor 104 via a display 108, the pattern associated with the at least one anomaly to at least one entity. In an example, the pattern of occurrence of the at least one anomaly in data logs is identified and displayed to the at least one entity in a form of a visual representation. In another example, the visual representation may be in the form of a tabular or graphical representation of the occurrence of the at least one anomaly. The visual representation of the at least one anomaly is displayed to the at least one entity based on comparisons of the set of data logs with the plurality of previously stored set of data logs. The system is further customized to display identified frequency of occurrence of a selected error over a selected duration, for instance over a week in the form of a visual representation.

At step S414, the method includes automatically triggering, by the at least one processor 104, the alerts for the at least one anomaly based on the identification of the pattern associated with the at least one anomaly. In an example, the occurrence of a specific anomaly in the data logs for a continuous number of days or weeks is automatically triggered as an alert to the support team. In another example, the at least one entity receives an alert based on the deviation in the set of data logs of Tuesday with the previously stored set of data logs of Monday of the same week. The method as disclosed herein uses a trained model to auto-adjust alerting threshold based on various parameters such as traffic pattern at the cloud-based server, the criticality of the at least one anomaly, and the duration of the existence of the anomaly. In an example, the at least one entity may include a user who may be a member of the production support team. The alert is triggered to inform the user of the occurrence of the at least one data anomaly that needs attention and handling by the user associated with the production support team.

Figure 5:
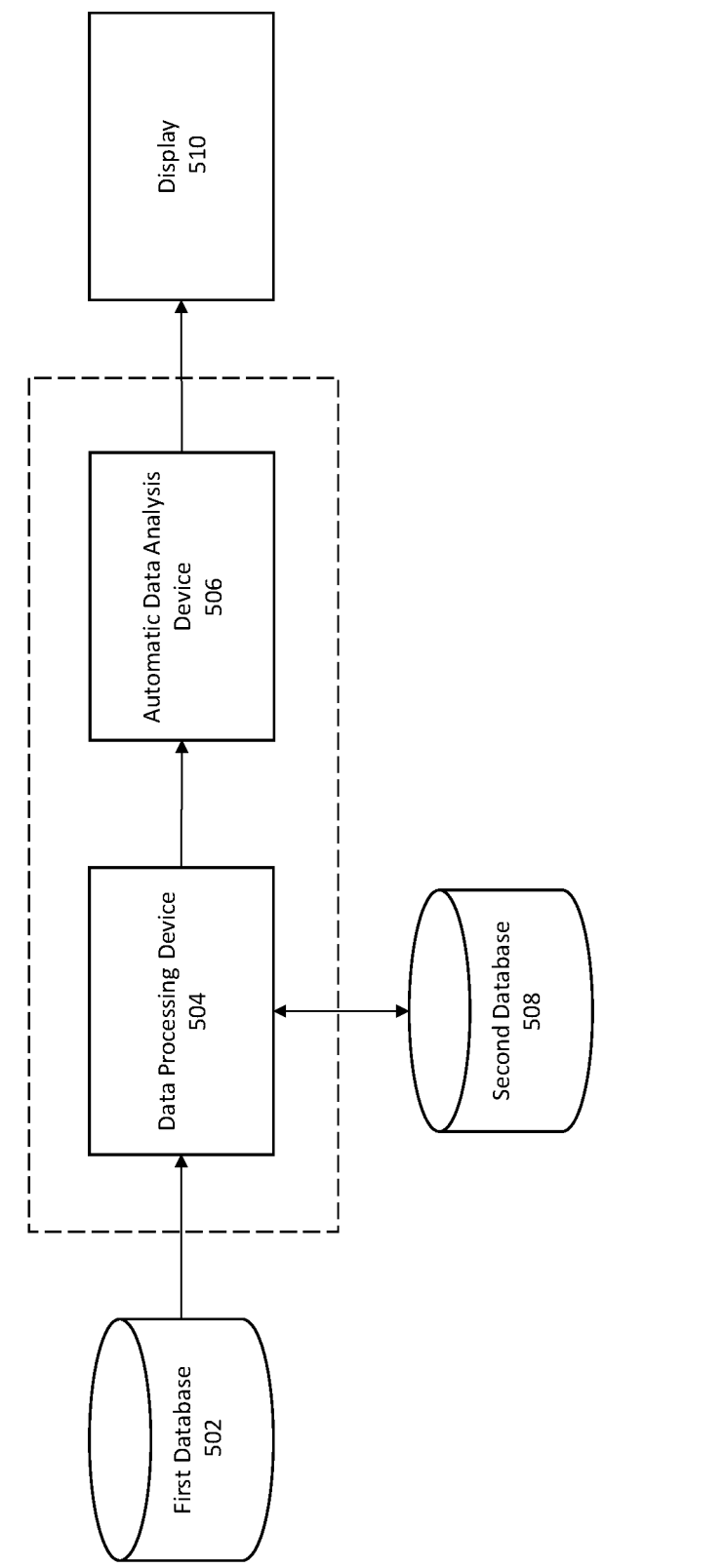
FIG. 5 illustrates a process flow diagram usable for implementing a method for automatically triggering alerts for at least one anomaly, in accordance with an exemplary embodiment.

FIG. 5 is a diagram that illustrates a process flow usable for implementing a method for automatically triggering alerts for the at least one anomaly to at least one entity in accordance with an exemplary embodiment. As illustrated in FIG. 5, the process flow 500 begins with receiving a plurality of data logs associated with a plurality of applications stored in a first database 502. The plurality of data logs is trimmed, using a Data processing Device 504, into a set of data logs by using a Data Modeling technique. The trimmed set of data logs is stored in a second database 508. Next, the set of data logs are compared, using the Automatic Data Analysis (ADA) Device 506, with each of a plurality of data logs previously stored in the second database. The result of the comparisons is used by the ADA device 506 to identify a new set of events associated with the at least one data anomaly in the set of data logs. The new set of events are analyzed, using the ADA device, to identify a pattern associated with the at least one anomaly. In an example, the trained model uses data mining techniques to identify the pattern and display the identified pattern, via a display, in the form of a visual representation. The production support team receives an alert, via the ADA Device, for the resolution of the at least one identified data anomaly.

Figure 6:
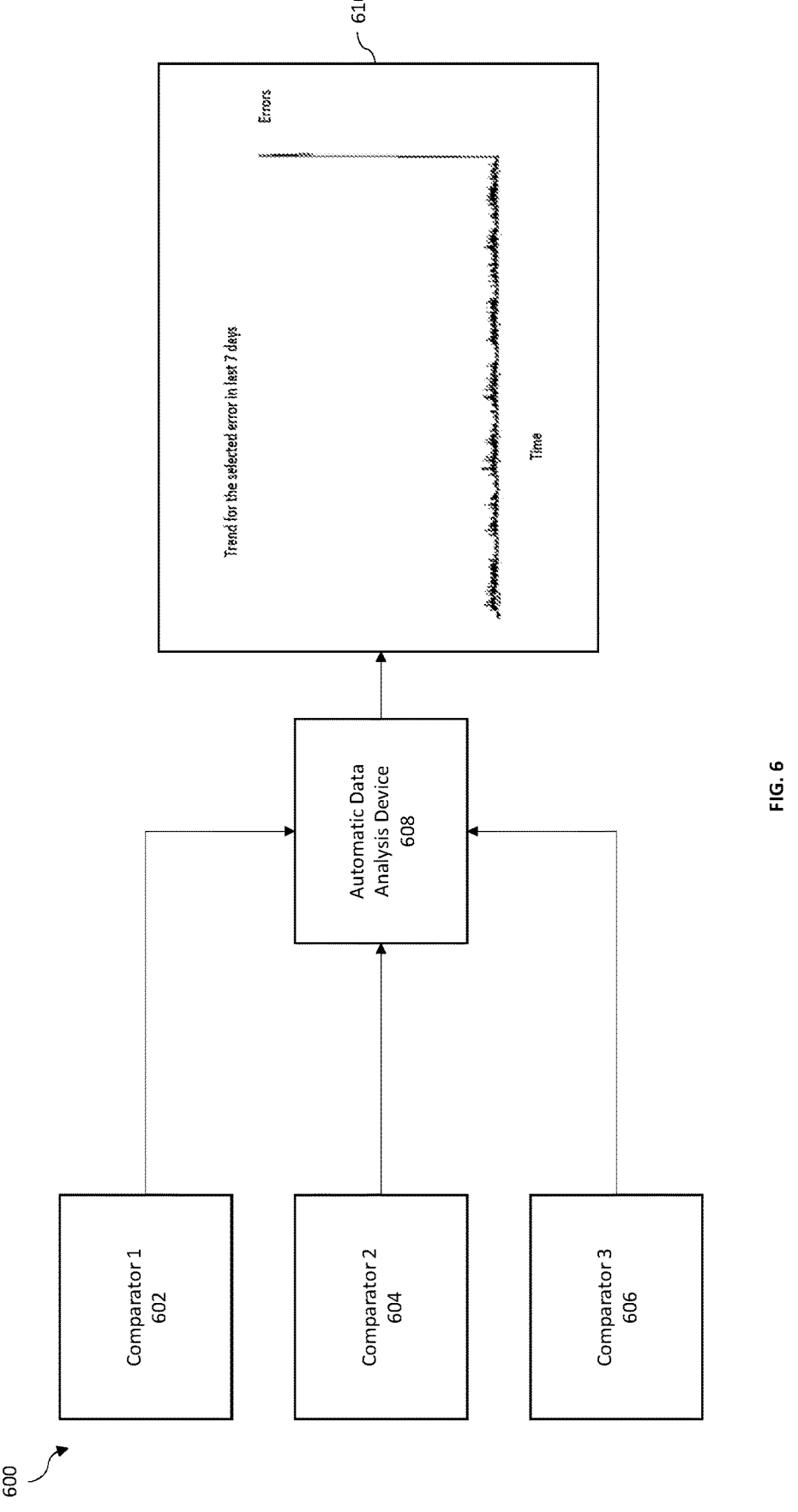
FIG. 6 illustrates a process flow diagram for comparison of the set of data logs with each of a plurality of previously stored set of data logs in accordance with an exemplary embodiment.

FIG. 6 illustrates a process flow diagram for comparison of a set of data logs with each of a plurality of previously stored set of data logs in accordance with an exemplary embodiment. As illustrated in FIG. 6, Comparator 1, Comparator 2, and Comparator 3 correspond to at least one processor configured to compare the set of data logs for identification of at least one from among at least one data anomaly associated with a possible set of errors provided by an application developer, sudden change in the data traffic on the cloud-based servers, sudden increase in error messages received from the end-users, and the like. Comparator 1, illustrated as 602, is configured to compare the current set of data logs with corresponding set of data logs of a previous working day. Comparator 2, illustrated as 604, is configured to compare the current set of data logs with a corresponding set of data logs of a working day of the previous week. Comparator 3, illustrated as 606, is configured to compare the current set of data logs with the data logs of a working day of a week just prior to the previous week. The results of the three comparisons performed herein are provided to ADA 608. The ADA device analyzes the results of the three comparisons to identify deviations in the data logs and to identify a pattern associated with the at least one anomaly. As illustrated in FIG. 6, in an exemplary embodiment, the pattern associated with the at least one anomaly is displayed to the user, via a display, in the form of a graphical representation 610. In FIG. 6, an illustrative example is shown to depict a trend associated with the selected error for the last 7 days as displayed to the user, wherein the frequency of occurrence of the selected error is shown on the vertical axis of the graphical representation 610 and time is shown on the horizontal axis of the graphical representation. In the event the selected error exceeds a tolerable limit or threshold, thereby reducing the availability of the application to unsatisfactory levels, the alert is triggered to the user by the ADA device 608. The ADA device uses a trained model to automatically adjust alerting threshold based on the traffic pattern received at the cloud-based servers and based on the results of the comparison performed using Comparator 1, Comparator 2, and Comparator 3.

In an example, the developer provides an error associated with application A with an identification code "error123" to the production support team. The present disclosure assists the production support team to identify and monitor the instances of occurrence of the "error123". The present disclosure further aids the production support team by triggering the alerts in case the error affects the availability of application A. For instance, if the percentage availability of application A is targeted at 99%. The trained model enables the identification of events where the "error123" brings the availability of application A below the set target and then the trained model triggers an alert to the production support team.

Accordingly, with this technology, the process for identifying at least one anomaly in data logs and triggering alerts for the at least one anomaly to at least one entity is disclosed. As evident from the above disclosure, the present solution provides significant technical advancement over the existing solutions by ensuring identification of the at least one data anomaly associated with a possible set of known errors provided by application developers, sudden change in the data traffic on the cloud-based servers, a sudden increase in error messages received from the end-users, and the like using the trained model. The use of present technology ensures that errors persisting over an extended duration without breaching the threshold of error per minute set by the application developer does not go unnoticed by the production support team. Therefore, as disclosed in the present disclosure, the method and system for the identification of an anomaly in data logs and automatically triggering the alerts to at least one user helps in avoiding the requirement of setting threshold of errors in advance, better handling of Business as Usual (BAU) errors, automatic triggering alert to the production support team, detecting errors persisting over a long duration of time efficiently, providing quick resolution for smooth functioning of the applications.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials, and embodiments, the invention is not intended to be limited to the particulars disclosed; rather the invention extends to all functionally equivalent structures, methods, and uses such as are within the scope of the appended claims.

For example, while the computer-readable storage medium may be described as a single medium, the term "computer-readable storage medium" includes a single medium or multiple media, such as a centralized or distributed database, and/or associated caches and servers that store one or more sets of instructions. The terms "computer-readable medium" and "computer-readable storage medium" shall also include any medium that is capable of storing, encoding, or carrying a set of instructions for execution by a processor or that causes a computer system to perform any one or more of the embodiments disclosed herein.

The computer-readable storage medium may include a non-transitory computer-readable storage medium or media and/or include a transitory computer-readable storage medium or media. In a particular non-limiting, exemplary embodiment, the computer-readable storage medium can include a solid-state memory such as a memory card or other package that houses one or more non-volatile read-only memories. Further, the computer-readable storage medium can be a random-access memory or other volatile re-writable memory. Additionally, the computer-readable storage medium can include a magneto-optical or optical medium, such as a disk or tape, or other storage device to capture carrier wave signals such as a signal communicated over a transmission medium. Accordingly, the present disclosure is considered to include any computer-readable storage medium or other equivalents and successor media, in which data or instructions may be stored.

Although the present application describes specific embodiments which may be implemented as computer programs or code segments in computer-readable storage media, it is to be understood that dedicated hardware implementations, such as application-specific integrated circuits, programmable logic arrays, and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

According to an aspect of the present disclosure, a non-transitory computer-readable storage medium storing instructions for automatically triggering alerts for at least one anomaly is disclosed. The instructions include executable code which, when executed by a processor, may cause the processor to receive, via a communication interface, a plurality of data logs associated with a plurality of applications; trim the plurality of data logs into a set of data logs; compare the set of data logs with each of a plurality of previously stored set of data logs; identify a set of new events associated with the at least one anomaly based on the comparison of the set of data logs with each of the plurality of previously stored set of data logs; analyze the set of new events to identify a pattern associated with the at least one anomaly; display, via a display, the pattern associated with the at least one anomaly to at least one entity; automatically trigger the alerts for the at least one anomaly based on the identification of the pattern associated with the at least one anomaly.

In an exemplary embodiment, the at least one anomaly is identified based on a deviation in the set of data logs with each of the plurality of previously stored set of data logs. In an exemplary embodiment, the pattern associated with at least one anomaly is displayed to the at least one entity in a form of a visual representation. In an exemplary embodiment, the plurality of previously stored set of data logs corresponds to at least one from among previous day stored logs, previous week stored logs, two weeks prior stored logs. In an exemplary embodiment, the plurality of the data logs is trimmed into the set of data logs using a data modelling technique.

Although the present specification describes components and functions that may be implemented in particular embodiments with reference to particular standards and protocols, the present disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to enable a general understanding of the various embodiments. The illustrations are not intended to serve as a complete description of all of the elements and features of apparatus and systems that utilize the structures or methods described herein. Many other embodiments may be apparent to those of skill in the art upon reviewing the present disclosure. Other embodiments may be utilized and derived from the present disclosure, such that structural and logical substitutions and changes may be made without departing from the scope of the present disclosure. Additionally, the illustrations are merely representational and may not be drawn to scale. Certain proportions within the illustrations may be exaggerated, while other proportions may be minimized. Accordingly, the present disclosure and the figures are to be regarded as illustrative rather than limiting.

One or more embodiments of the present disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the present Disclosure is submitted with the understanding that it will not be used to interpret or limit the scope or meaning of the claims. In addition, in the foregoing Detailed Description, various features may be grouped together or described in a single embodiment for the purpose of streamlining the present disclosure. This disclosure is not to be interpreted as reflecting an intention that the claimed embodiments require more features than are expressly recited in each claim. Rather, as the following claims reflect, the inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not limiting, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for automatically triggering alerts for at least one anomaly, the method being implemented by at least one processor, the method comprising:

receiving, by the at least one processor via a communication interface, a plurality of data logs associated with a plurality of applications;

trimming, by the at least one processor, the plurality of data logs into a set of data logs;

comparing, by the at least one processor, the set of data logs with each of a plurality of previously stored set of data logs corresponding to at least one from among previous day stored logs, previous week stored logs, two weeks prior stored logs and identifying deviations including a sudden change in data traffic at one or more cloud-based servers based on comparison results;

identifying, by the at least one processor, a set of new events associated with the at least one anomaly based on the comparison of the set of data logs with each of the plurality of previously stored set of data logs;

analyzing, by the at least one processor using a trained model, the set of new events to identify a pattern associated with the at least one anomaly;

displaying, by the at least one processor via a display, the pattern associated with the at least one anomaly to at least one entity;

automatically triggering, by the at least one processor, the alerts for the at least one anomaly based on the identification of the pattern associated with the at least one anomaly and based on an altering threshold; and utilizing, by the at least one processor, the trained model to auto-adjust the alerting threshold based on a traffic pattern at the one or more cloud-based servers identified from the comparison results and based on a duration of an existence of the anomaly.

2. The method as claimed in claim 1, wherein the pattern associated with the at least one anomaly is displayed to the at least one entity in a form of a visual representation.

3. The method as claimed in claim 1, wherein the at least one anomaly is identified based on a deviation in the set of data logs with each of the plurality of previously stored set of data logs.

4. The method as claimed in claim 1, wherein the plurality of the data logs is trimmed into the set of data logs using a data modeling technique.

5. A computing device configured to implement an execution of a method for automatically triggering alerts for at least one anomaly, the computing device comprising:

a processor;

a memory; and a communication interface coupled to each of the processor and the memory, wherein the processor is configured to:

receive, via the communication interface, a plurality of data logs associated with a plurality of applications;

trim the plurality of data logs into a set of data logs;

compare the set of data logs with each of a plurality of previously stored set of data logs corresponding to at least one from among previous day stored logs, previous week stored logs, two weeks prior stored logs and identifying deviations including a sudden change in data traffic at one or more cloud-based servers based on comparison results;

identify a set of new events associated with the at least one anomaly based on the comparison of the set of data logs with each of the plurality of previously stored set of data logs;

analyze the set of new events to identify a pattern associated with the at least one anomaly;

display, via a display, the pattern associated with the at least one anomaly to at least one entity;

automatically trigger the alerts for the at least one anomaly based on the identification of the pattern associated with the at least one anomaly and based on an altering threshold; and utilize the trained model to auto-adjust the alerting threshold based on a traffic pattern at the one or more cloud-based servers identified from the comparison results and based on a duration of an existence of the anomaly.

6. The computing device as claimed in claim 5, wherein the pattern associated with the at least one anomaly is displayed to the at least one entity in a form of a visual representation.

7. The computing device as claimed in claim 5, wherein the at least one anomaly is identified based on a deviation in the set of data logs with each of the plurality of previously stored set of data logs.

8. The computing device as claimed in claim 5, wherein the plurality of the data logs is trimmed into the set of data logs using a data modelling technique.

9. A non-transitory computer readable storage medium storing instructions for automatically triggering alerts for at least one anomaly, the instructions comprising executable code which, when executed by a processor, causes the processor to:

receive, via a communication interface, a plurality of data logs associated with a plurality of applications;

trim the plurality of data logs into a set of data logs;

compare the set of data logs with each of a plurality of previously stored set of data logs corresponding to at least one from among previous day stored logs, previous week stored logs, two weeks prior stored logs and identifying deviations including a sudden change in data traffic at one or more cloud-based servers based on comparison results;

identify a set of new events associated with the at least one anomaly based on the comparison of the set of data logs with each of the plurality of previously stored set of data logs;

analyze the set of new events to identify a pattern associated with the at least one anomaly;

display, via a display, the pattern associated with the at least one anomaly to at least one entity;

automatically trigger the alerts for the at least one anomaly based on the identification of the pattern associated with the at least one anomaly and based on an altering threshold; and utilize the trained model to auto-adjust the alerting threshold based on a traffic pattern at the one or more cloud-based servers identified from the comparison results and based on a duration of an existence of the anomaly.

10. The non-transitory computer readable storage medium as claimed in claim 9, wherein the pattern associated with the at least one anomaly is displayed to the at least one entity in a form of a visual representation.

11. The non-transitory computer readable storage medium as claimed in claim 9, wherein the at least one anomaly is identified based on a deviation in the set of data logs with each of the plurality of previously stored set of data logs.

12. The non-transitory computer readable storage medium as claimed in claim 9, wherein the plurality of the data logs is trimmed into the set of data logs using a data modelling technique.

* * * * *